United States Patent [19]

Tanaka et al.

[11] Patent Number: 5,470,666
[45] Date of Patent: Nov. 28, 1995

[54] ALUMINUM BASE ALLOY BEARING HAVING SUPERIOR FATIGUE RESISTANCE

[75] Inventors: Tadashi Tanaka; Masaaki Sakamoto; Yoshiaki Sato, all of Nagoya, Japan

[73] Assignee: Daido Metal Company, Ltd., Nagoya, Japan

[21] Appl. No.: 353,271

[22] Filed: Dec. 5, 1994

[30] Foreign Application Priority Data

Dec. 27, 1993 [JP] Japan .................................. 5-332187

[51] Int. Cl.⁶ ............................................ F16C 33/12
[52] U.S. Cl. .................... 428/653; 428/650; 428/654; 384/912
[58] Field of Search ........................... 428/650, 652, 428/653, 654, 686, 925; 384/912

[56] References Cited

U.S. PATENT DOCUMENTS

| | | | |
|---|---|---|---|
| 3,950,141 | 4/1976 | Roemer | 428/654 |
| 4,189,525 | 2/1980 | Mori | 428/654 |
| 5,075,177 | 12/1991 | Tanaka et al. | 428/653 |
| 5,362,574 | 11/1994 | Tanaka et al. | 428/654 |
| 5,384,205 | 1/1995 | Tanaka et al. | 428/654 |

FOREIGN PATENT DOCUMENTS

| | | |
|---|---|---|
| 61-79023 | 4/1986 | Japan . |
| 3168411 | 7/1991 | Japan . |

*Primary Examiner*—John Zimmerman
*Attorney, Agent, or Firm*—Browdy and Neimark

[57] ABSTRACT

In an aluminum base alloy bearing, the effect of reinforcement of an aluminum base bearing alloy layer by an intermediate bonding layer is enhanced, thereby enhancing a fatigue resistance of the aluminum base bearing alloy layer. The aluminum base alloy bearing comprises a back metal layer, the intermediate bonding layer, and the aluminum base bearing alloy layer. The hardness of the intermediate bonding layer is in the range of 25 to 60 in terms of Vickers hardness, and the thickness of the intermediate bonding layer is 0.5 to 0.9 times in the sum of both the thickness of the intermediate bonding layer and the thickness of the aluminum base bearing alloy layer. With this construction, the effect of reinforcement of the aluminum base bearing alloy layer by the intermediate bonding layer is enhanced, thereby enhancing the fatigue resistance.

4 Claims, 2 Drawing Sheets

FIG. 3

| | No. | MAXIMUM SPECIFIC LOAD WITHOUT FATIGUE (MPa) | | | | |
|---|---|---|---|---|---|---|
| | | 30 | 35 | 40 | 45 | 50 |
| COMPARATIVE PRODUCT | 1 | →30 | | | | |
| | 2 | →→→40 | | | | |
| | 3 | →35 | | | | |
| | 4 | →35 | | | | |
| | 5 | →30 | | | | |
| | 6 | →35 | | | | |
| | 7 | →35 | | | | |
| | 8 | →→40 | | | | |
| INVENTION PRODUCT | 9 | →35 | | | | |
| | 10 | →→→→45 | | | | |
| | 11 | →→→45 | | | | |
| | 12 | →→40 | | | | |
| | 13 | →→40 | | | | |
| | 14 | →→40 | | | | |
| | 15 | →→→45 | | | | |
| | 16 | →→→→47 | | | | |
| | 17 | →→40 | | | | |

ALUMINUM BASE ALLOY BEARING HAVING SUPERIOR FATIGUE RESISTANCE

BACKGROUND OF THE INVENTION

This invention relates generally to an aluminum base alloy bearing having an intermediate bonding layer formed between a back metal layer and an aluminum base bearing alloy layer, and more particularly to an aluminum base alloy bearing of the type in which a fatigue resistance is improved, directing attention to the hardness and thickness of an intermediate bonding layer.

There is well known an aluminum base alloy bearing which has an intermediate bonding layer formed between a back metal layer and an aluminum base bearing alloy layer for the purpose of increasing the strength of bonding between them.

An aluminum base alloy bearing is relatively excellent in fatigue resistance, and has a high strength, and therefore has been used as a bearing for a shaft repeatedly subjected to high loads, such as a crankshaft of an engine of an automobile or an ordinary industrial machine. With a high output design of the engine, the aluminum base alloy bearing has now been required to have a higher fatigue resistance.

Under the circumstances, there have been proposed aluminum base alloy bearings in which attention is directed to an intermediate bonding layer, and the intermediate bonding layer is improved to thereby enhance a fatigue resistance. Such aluminum base alloy bearings are disclosed in JP-B2-5-53966 and JP-A-3-168411.

In the aluminum base alloy bearing disclosed in the above JP-B2-5-53966, the hardness of the intermediate bonding layer is decreased to directly enhance conformability, and a fatigue resistance is enhanced indirectly through the enhanced conformability. More specifically, if a shaft is inclined due to manufacturing errors of the shaft, a bearing and a housing, an uneven contact develops between the shaft and a bearing alloy layer because of this inclination, so that a large concentrated load acts on this uneven contact portion, thereby lowering the fatigue resistance. In order to overcome this difficulty, the hardness of the intermediate bonding layer is decreased so that this intermediate bonding layer can function as a cushioning material for the bearing alloy layer. By doing so, the conformability of the bearing alloy layer is enhanced, thereby alleviating the uneven contact between the shaft and the bearing alloy.

In the aluminum base alloy bearing disclosed in the above JP-A-3-168411, the hardness of the intermediate bonding layer is increased to a level not exceeding that of a bearing alloy layer, so that the intermediate bonding layer reinforces the bearing alloy layer while not affecting the cushioning property and hence conformability of the intermediate bonding layer as much as possible, thereby enhancing the fatigue resistance.

However, the inventors of the present invention have found that the fatigue resistance of the bearing is insufficient in spite of the endeavor explained above.

SUMMARY OF THE INVENTION

With the above problems in view, it is an object of this invention to provide an aluminum base alloy bearing in which the effect of reinforcing an aluminum base bearing alloy layer by an intermediate bonding layer can be enhanced, thereby enhancing a fatigue resistance of the aluminum base bearing alloy layer.

Recently, with the improvement of the machining technology, manufacturing errors of a shaft, a bearing and a housing can be limited to a very narrow range. Therefore, the inclination of the shaft can be suppressed to a very narrow range, and this tendency is getting more and more conspicuous. Therefore, recently, it has been required to directly enhance the fatigue resistance of the bearing alloy layer rather than to indirectly enhance the fatigue resistance through the improvement of the conformability.

However, in the alloy bearing disclosed in the above JP-B2-5-53966, in order to increase the cushioning property of the intermediate bonding layer, the hardness of this intermediate bonding layer is decreased so as to enhance the conformability. Therefore, the bearing alloy can not be reinforced by the intermediate bonding layer, and the aluminum base alloy bearing used under a high load is rather lowered in fatigue resistance in a situation in which the inclination of the shaft is so small that the conformability is not required to be so high.

In the alloy bearing disclosed in the above JP-A-3-168411, the intermediate bonding layer is increased in hardness to reinforce the bearing alloy layer. However, the thickness of the intermediate bonding layer described in Examples of this prior publication is smaller as compared with that of the bearing alloy layer, and therefore the bearing alloy layer is not sufficiently reinforced by the intermediate boding layer, and the aluminum base alloy bearing of this type used under a high load is not sufficiently enhanced in fatigue resistance.

According to the present invention, there is provided an aluminum base alloy bearing having a superior fatigue resistance, which comprises a back metal layer, an intermediate bonding layer bonded onto the back metal layer, and an aluminum base bearing alloy layer bonded onto the intermediate layer, the hardness of the intermediate bonding layer being in the range of 25 to 60 in terms of Vickers hardness, the thickness of the intermediate bonding layer being 0.5 to 0.9 times in the sum of both the thickness of the intermediate bonding layer and the thickness of the aluminum base bearing alloy layer.

Preferably, the intermediate bonding layer consists, by weight, of at least one kind of 0.3 to 5% in total selected from the group consisting of Mn, Cu, Zn, Si, Mg and Fe, and the balance Al and incidental impurities.

Preferably, the aluminum base bearing alloy layer consists, by weight, of 3 to 40% Sn, 0.1 to 3% Si, not more than 10% Pb, 0.2 to 5% Cu, at least one kind of not more than 3% in total selected from the group consisting of Ni, Mn, V, Mg and Sb, and the balance Al and incidental impurities.

In the aluminum base alloy bearing of the present invention having a superior fatigue resistance, explanation will be made of the reasons why the hardness of the intermediate bonding layer is not less than 25 but not more than 60 in terms of Vickers hardness (hereinafter referred to as "Hv"), and why the thickness of the intermediate bonding layer is 0.5 to 0.9 times in the sum of both the thickness of the intermediate bonding layer and the thickness of the aluminum base bearing alloy layer.

Generally, in order to enhance a fatigue resistance of a bearing, it is preferred that the hardness be decreasing sequentially from a back metal layer toward a bearing alloy layer. In this connection, in the alloy bearing disclosed in the JP-B2-5-53966, since the intermediate bonding layer is required to have the cushioning property, the hardness of the intermediate bonding layer is low. Therefore, the hardness is abruptly decreased at the intermediate bonding layer, so that the degree of reinforcement of the bearing alloy layer is lowered.

In the present invention, since the hardness of the intermediate bonding layer is Hv25 at the lowest, the degree of decrease in the hardness at the intermediate bonding layer is low, and the reinforcement of the bearing alloy layer is enhanced to thereby enhance the fatigue resistance. Although the degree of inclination of a shaft is rendered low by the improved machining technology, it is not possible to entirely eliminate this inclination, and therefore a slight degree of conformability is still necessary. If the hardness of the intermediate bonding layer exceeds Hv60, the conformability is eliminated, and this rather lowers the fatigue resistance.

Considering the strength of the surface of the bearing alloy layer in direct contact with a shaft, if the combined thicknesses of the intermediate bonding layer and the bearing alloy layer are large, the amount of deflection of the surface of the bearing alloy layer due to repeatedly-applied loads increases, so that the bearing is subjected to a premature fatigue. In contrast, if the combined thicknesses are small, the back metal layer is exposed relatively early by wear, and depending on the manufacturing accuracy of the bearing material, the thickness of the bearing alloy layer varies, and when this bearing material is processed or worked into a bearing, the bearing alloy layer has portions whose thickness becomes very thin.

For these reasons, the combined thicknesses of the intermediate bonding layer and the bearing alloy layer are limited to a certain range. Under this limitation, if the intermediate bonding layer is thin, the thickness of the bearing alloy layer increases relatively, so that the reinforcement of the surface of the bearing alloy layer for direct contact with the shaft can not be assured by the intermediate bonding layer of greater hardness. Therefore, the thickness of the intermediate bonding layer should be not less than 0.5 times in the sum of the thickness of the intermediate bonding layer and the thickness of the aluminum base bearing alloy layer. If the thickness of the intermediate bonding layer is more than 0.9 times in the sum of the thickness of the intermediate bonding layer and the thickness of the aluminum base bearing alloy layer, the conformability is lowered, which rather lowers the fatigue resistance.

In the alloy bearing disclosed in the above JP-A-3-168411, the intermediate bonding layer has the hardness of not less than Hv25, but the thickness thereof is very small on the order of 0.02 to 0.06 mm as described in Examples of this prior publication, and besides it is to be noted that no mention is made of the ratio of this thickness to the sum of both the thickness of the intermediate bonding layer and the thickness of the bearing alloy layer.

In the present invention, the elements, added to the aluminum (main component) of the intermediate bonding layer, serve to strengthen the intermediate bonding layer, and these strengthening elements are either in a solid-solution state in an aluminum matrix, or finely crystallized or precipitated, thereby enhancing the strength (hardness). It is effective to add as these strengthening elements at least one kind selected from the group consisting of Mn, Cu, Zn, Si, Mg and Fe. In this case, if the total amount of these strengthening elements is less than 0.3 wt. %, a satisfactory effect is not achieved, and if this total amount is more than 5% wt. %, the hardness of the intermediate bonding layer becomes too high.

Explanation will now be made of the reason why the components added to aluminum (main component) of the aluminum base bearing alloy layer are, by weight, 3 to 40% Sn, 0.1 to 3% Si, not more than 10% Pb, 0.2 to 5% Cu, and at least one kind of not more than 3% in total selected from the group consisting of Ni, Mn, V, Mg and Sb.

(1) Sn: 3 to 40%

Sn improves surface properties of the bearing such as a seizure resistance, conformability and embeddability. If this content is less than 3%, a satisfactory effect is not obtained, and if this content is more than 40%, mechanical properties of the bearing alloy are lowered.

(2) Si: 0.1 to 3%

Si is in a solid-solution state in the aluminum matrix, or crystallized as Si particles of high hardness, thereby increasing the hardness. If this content is less than 0.1%, such an effect is not obtained, and if this content is more than 3%, the alloy layer becomes brittle, and is inferior in workability such as a rolling ability.

(3) Pb: not more than 10%

Pb improves a cutting ability and a seizure resistance. If this content is more than 10%, it becomes very difficult to disperse Pb uniformly in the aluminum matrix, so that the cutting ability and the seizure resistance are affected. And besides, the strength is adversely affected.

(4) Cu: 0.2 to 5%

Cu enhances the strength of the aluminum matrix, and also is very effective in enhancing a fatigue strength. If this content is less than 0.2%, a satisfactory effect is not achieved, and if this content is more than 5%, the conformability is lowered, and plastic workability is adversely affected.

(5) At least one kind selected from the group consisting of Ni, Mn, V, Mg and Sb: not more than 3% in total These elements are either in a solid-solution state in the aluminum matrix or precipitated as intermetallic compounds, thereby enhancing the strength. If this content is more than 3%, coarse compounds are formed, or the alloy layer becomes brittle, so that mechanical properties such as a rolling ability is adversely affected.

BRIEF DESCRIPTION OF THE DRAWINGS

FIG. 3 is comparative results from fatigue tests.

DESCRIPTION OF THE PREFERRED EMBODIMENTS

Preferred embodiments of the present invention will now be described specifically.

Figure 1:
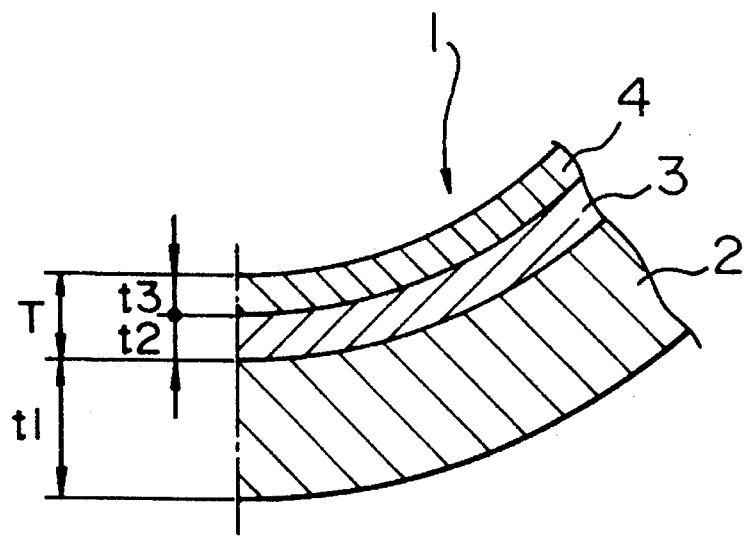
FIG. 1 is a cross-sectional view of a portion of a preferred embodiment of a half bearing of the present invention.

FIG. 1 shows an aluminum base alloy bearing of the present invention. This bearing 1 of a three-layer construction comprises a back metal layer 2, an intermediate bonding layer 3, and an aluminum base bearing alloy layer 4, and is, for example, in the form of a half bearing.

Figure 2:
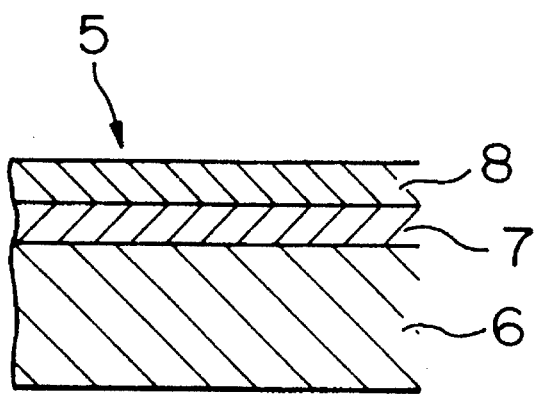
FIG. 2 is a cross-sectional view of a portion of a bearing material.

As shown in FIG. 2, a bearing material for forming this bearing 1 is produced using a low-carbon steel sheet 6 (serving as the back metal layer 2), an aluminum alloy sheet 7 (serving as the intermediate bonding layer 3) and an aluminum base bearing alloy sheet 8 (serving as the aluminum base bearing alloy layer 4). Generally, the low-carbon steel sheet 6 contains 0.02 to 0.35 wt. % carbon.

The aluminum alloy sheet 7 consists, by weight, of at least one kind of 0.3 to 5% in total selected from the group consisting of Mn, Cu, Zn, Si, Mg and Fe, and the balance Al and incidental impurities.

The aluminum base bearing alloy sheet 8 consists, by weight, of 3 to 40% Sn, 0.1 to 3% Si, not more than 10% Pb, 0.2 to 5% Cu, at least one kind of not more than 3% in total selected from the group consisting of Ni, Mn, V, Mg and Sb, and the balance Al and incidental impurities.

The aluminum alloy sheet 7 having a thickness of about 1 mm to about 20 mm, as well as the aluminum base bearing alloy sheet 8, is produced by ordinary casting and rolling. For producing the bearing material 5 using the aluminum alloy sheet 7 and the aluminum base bearing alloy sheet 8, the two sheets 7 and 8 are first superposed such that $t_2/T$ (where $t_2$ represents the thickness of the intermediate bonding layer, and T represents the sum of the thickness of the intermediate bonding layer and the thickness of the bearing alloy layer) shown in Table 1 is obtained, and then the thus superposed sheets 7 and 8 are rolled (, that is, pressure-bonded) at a rolling reduction of 40 to 80% into a composite aluminum sheet. Thereafter, the low-carbon steel sheet 6 is superposed on the aluminum alloy sheet side (serving as the intermediate bonding layer 3) of this composite aluminum sheet, and then the two sheets are rolled (, that is, pressure-bonded) at a rolling reduction of 35 to 50% into the bearing material 5 shown in FIG. 2.

In the half bearings 1 produced by working the thus produced bearing materials 5, the thickness $t_1$ of the back metal layer 2 was 1.17 to 1.23 mm, and the hardness thereof was Hv170 to Hv220, and the sum T of the thickness $t_2$ of the intermediate bonding layer 3 and the thickness $t_3$ of the aluminum base bearing alloy layer 4 was about 0.3 mm, and the hardness of the bearing alloy layer was Hv32 to Hv49.

The thickness $t_2$ of the intermediate bonding layer 3 is 0.5 to 0.9 times in the sum T (0.3 mm) of both the thickness of the intermediate bonding layer 3 and the thickness of the aluminum base bearing alloy layer 4, that is, 0.15 to 0.27 mm. The hardness of the intermediate bonding layer 3 is not less than Hv25 but not more than 60Hv.

The inventor of the present invention measured the hardness of the intermediate bonding layers of the bearings of the present invention (invention products) and conventional bearings (comparative products) whose compositions are shown in Table 1, and obtained results shown in this Table. The thickness $t_2$ of the intermediate bonding layers 3 and the thickness $t_3$ of the aluminum base bearing alloy layer 4 were measured to determine $t_2/T$, and results thereof are also shown in Table 1.

Further, the inventor of the present invention conducted a fatigue test for the invention products and the comparative products, and obtained results shown in FIG. 3. Conditions of the fatigue test are shown in Table 2.

TABLE 1

| | No. | COMPOSITION OF BEARING ALLOY (wt. %) | | | | | | | | | HARDNESS OF BEARING ALLOY LAYER |
|---|---|---|---|---|---|---|---|---|---|---|---|
| | | Al | Sn | Si | Cu | Pb | Ni | Mn | V | Mg | Sb | Hv5 |
| COMPARA- | 1 | Balance | 20 | 2.5 | 1.0 | | | | | | | 37 |
| TIVE | 2 | " | 12 | 2.5 | 1.0 | 1.5 | | 0.3 | 0.3 | | 0.3 | 46 |
| PRODUCT | 3 | " | 10 | 2.0 | | | | 1.5 | | | | 40 |
| | 4 | " | 20 | 0.1 | 1.0 | 1.0 | 0.3 | | 0.2 | | 0.1 | 38 |
| | 5 | " | 40 | 1.5 | 0.8 | | | | | | | 32 |
| | 6 | " | 3 | 3.0 | 1.5 | 10.0 | | 0.3 | | | | 45 |
| | 7 | " | 17 | 2.0 | 0.2 | 1.4 | 0.8 | | 0.3 | | 0.3 | 43 |
| | 8 | " | 12 | 2.5 | 0.3 | 1.5 | 1.2 | 0.5 | 0.3 | 0.5 | 0.5 | 49 |
| INVEN- | 9 | " | 20 | 2.5 | 1.0 | | | | | | | 37 |
| TION | 10 | " | 12 | 2.3 | 1.0 | 1.5 | | 0.3 | 0.3 | | 0.3 | 46 |
| PRODUCT | 11 | " | 10 | 2.0 | | | | 1.5 | | | | 40 |
| | 12 | " | 20 | 0.1 | 1.0 | 1.0 | 0.3 | | 0.2 | | 0.1 | 38 |
| | 13 | " | 40 | 1.5 | 0.8 | | | | | | | 32 |
| | 14 | " | 3 | 3.0 | 1.5 | 10.0 | | 0.3 | | | | 45 |
| | 15 | " | 17 | 2.0 | 0.2 | 1.4 | 0.8 | | 0.3 | | 0.3 | 43 |
| | 16 | " | 12 | 2.5 | 0.3 | 1.5 | 1.2 | 0.5 | 0.3 | 0.5 | 0.5 | 49 |
| | 17 | " | 20 | 0.5 | 5.0 | | | | | | | 43 |

| | No. | COMPOSITION OF INTERMEDIATE BONDING LAYER ALLOY (wt. %) | | | | | | HARDNESS OF INTERMEDIATE BONDING LAYER | $\dfrac{t_2}{T}$ |
|---|---|---|---|---|---|---|---|---|---|
| | | Al | Mn | Cu | Zn | Si | Mg | Fe | Hv5 | |
| COMPARA- | 1 | 100 | | | | | | | 19.0 | 0.6 |
| TIVE | 2 | Balance | | 0.3 | | 1.0 | 0.8 | | 29.5 | 0.4 |
| PRODUCT | 3 | " | 2.0 | 1.5 | | 2.5 | 0.5 | 0.5 | 61.0 | 0.9 |
| | 4 | " | | 1.2 | 0.15 | | | | 30.1 | 0.3 |
| | 5 | " | | 1.2 | 0.15 | | | | 30.1 | 0.3 |
| | 6 | 100 | | | | | | | 19.0 | 0.5 |
| | 7 | Balance | | 1.0 | 2.0 | 1.0 | | 0.3 | 35.0 | 0.3 |
| | 8 | " | | 1.5 | | 2.0 | | | 43.0 | 0.95 |
| INVEN- | 9 | " | | 0.3 | | 1.0 | 0.8 | | 29.5 | 0.5 |
| TION | 10 | " | | 1.2 | 0.15 | | | | 30.1 | 0.9 |
| PRODUCT | 11 | " | | 1.2 | 0.15 | | | | 30.1 | 0.7 |
| | 12 | " | | 1.5 | | 2.0 | | | 43.0 | 0.5 |
| | 13 | " | | 1.2 | 0.15 | | | | 30.1 | 0.8 |
| | 14 | " | | 1.0 | 2.0 | 1.0 | | 0.3 | 35.0 | 0.6 |

TABLE 1-continued

| 15 | " | 0.3 |     |     | 25.5 | 0.9 |
|----|---|-----|-----|-----|------|-----|
| 16 | " |     | 1.5 |     | 32.0 | 0.8 |
| 17 | " | 0.3 | 1.0 | 0.8 | 29.5 | 0.7 |

TABLE 2

| Test conditions | |
| --- | --- |
| Testing machine | Dynamic load testing machine |
| Number of revolutions | 4,000 rpm |
| Testing time | 20 hours |
| Peripheral speed | 11.1 m/sec. |
| Oil supply temperature | 120° C. |
| Oil supply pressure | 3 kgf/cm$^2$ (0.29 MPa) |
| Lubricating oil | SAE #20 |
| Oil supply angle | Angle of advance: 36° |

Influences of the hardness of the intermediate bonding layer and t2/T on the fatigue resistance will now be analyzed from the data of Table 1 and FIG. 3.

(1) Hardness of Intermediate Bonding Layer

As is clear from the comparison between comparative product No. 1 and invention product No. 9 and the comparison between comparative product No. 6 and invention product No. 14, it will be appreciated that invention product Nos. 9 and 14 (in which the hardness of the intermediate layer 3 is not less than Hv25) are superior in fatigue resistance to comparative product Nos. 1 and 6 (in which the hardness of the intermediate bonding layer is less than Hv25) even if their aluminum base bearing alloy layers 4 have the same composition, and the ratio (hereinafter referred to merely as "t2/T) of the thickness of the intermediate bonding layer 3 to the sum T of the thickness t2 of the intermediate bonding layer 3 and the thickness t3 of the aluminum base bearing alloy layer 4 is not less than 0.5.

From the comparison between invention product Nos. 9 and 12 and the comparison between invention product Nos. 10 and 15, it will be appreciated that the higher the hardness of the intermediate bonding layer 3 is, the higher the fatigue resistance is even if the same t2/T value is obtained. However, from the comparison between comparative product No. 3 and invention product No. 11, it will also be appreciated that the hardness of the intermediate bonding layer 3 exceeds Hv60, the fatigue resistance is rather lowered.

(2) t2/T

As is clear from the comparison between comparative product No. 2 and invention product No. 10 (in which the aluminum base bearing alloy layers 4 have the same composition, and the intermediate bonding layers 3 have generally the same hardness), the comparison between comparative product No. 4 and invention product No. 12 (in which the aluminum base bearing alloy layers 4 have the same composition) and the comparison between comparative product No. 7 and invention product No. 15 (in which the aluminum base bearing alloy layers 4 have the same composition), or from the comparison between comparative product Nos. 4 and 5 and invention product Nos. 10, 11 and 13 (in which the intermediate bonding layers 3 have the same hardness), the invention products whose t2/T value is not less than 0.5 are superior in fatigue resistance to the comparative products whose t2/T value is less than 0.5.

From the comparison between comparative product No. 8 and invention product No. 16 or the comparison between comparative product No. 8 and invention product Nos. 10 and 15, it will be appreciated that if t2/T is more than 0.9, the fatigue resistance is rather lowered.

With respect to t2/T, its value of comparative product No. 2 is less than 0.5, and its value of comparative product No. 8 is more than 0.9, and despite this these comparative products are superior in fatigue resistance to invention product No. 9 whose t2/T value falls within the range of 0.5 to 0.9. The reason for this is that the composition of the aluminum base bearing alloy layers 4 of these comparative products is originally superior in fatigue resistance. By the way, invention product Nos. 10 and 16 whose aluminum base bearing alloy layers 4 have the same compositions as those of the aluminum base bearing alloy layers 4 of comparative product Nos. 2 and 8, respectively, are far superior in fatigue resistance to comparative product Nos. 2 and 8.

As will be appreciated from the above description or from the fatigue test results of FIG. 3, the invention products, in which the hardness of the intermediate bonding layer 3 is in the range of Hv25 to Hv60, and t2/T is in the range of 0.5 to 0.9, are superior in fatigue resistance to the comparative products in which the hardness of the intermediate bonding layer, as well as t2/T, is outside such range.

The intermediate bonding layers 3 of invention product Nos. 9 to 17 which consist, by weight, of at least one kind of 0.3 to 5% in total selected from the group consisting of Mn, Cu, Zn, Si, Mg and Fe, and the balance Al and incidental impurities, are greater in hardness than the intermediate bonding layers 3 of comparative product Nos. 1 and 6 which do not contain Mn, Cu, Zn, Si, Mg and Fe, and therefore the strength of the invention products are higher than that of these comparative products. In contrast, the hardness of the intermediate bonding layer 3 of comparative product No. 3, which contains at least one kind of more than 5% in total selected from the group consisting of Mn, Cu, Zn, Si, Mg and Fe, is Hv61, so that the fatigue resistance is rather inferior.

The invention products, in which the aluminum base bearing alloy layer consists, by weight, of 3 to 40% Sn, 0.1 to 3% Si, not more than 10% Pb, 0.2 to 5% Cu, at least one kind of not more than 3% in total selected from the group consisting of Ni, Mn, V, Mg and Sb and the balance Al and incidental impurities, are made superior in fatigue resistance when the hardness of the intermediate bonding layer 3 is Hv25 to Hv60, and t2/T is 0.5 to 0.9.

As described above, the present invention achieves the following advantageous effects.

In the aluminum base alloy bearing of claim 1, the hardness of the intermediate bonding layer is in the range of 25 to 60 in terms of Vickers hardness, and wherein the thickness of the intermediate bonding layer is 0.5 to 0.9 times in the sum of both the thickness of the intermediate bonding layer and the thickness of the aluminum base bearing alloy layer. With the improvement of the machining technology, manufacturing errors of a shaft, a bearing and a housing can be limited to a very narrow range, and as a result it has now been required to enhance the fatigue resistance rather than the conformability. With this construction of the aluminum base alloy bearing, this requirement can be met, and the fatigue resistance can be enhanced.

In the aluminum base alloy bearing of claim 2, the intermediate bonding layer consists, by weight, of at least one kind of 0.3 to 5% in total selected from the group consisting of Mn, Cu, Zn, Si, Mg and Fe, and the balance Al and incidental impurities. With this construction, the hardness of the intermediate bonding layer is not unduly increased, but can be increased to a level suitable for enhancing the fatigue resistance.

In the aluminum base alloy bearing of claim 3, the aluminum base bearing alloy layer consists, by weight, of 3 to 40% Sn, 0.1 to 3% Si, not more than 10% Pb, 0.2 to 5% Cu, at least one kind of not more than 3% in total selected from the group consisting of Ni, Mn, V, Mg and Sb, and the balance Al and incidental impurities. With this construction, the fatigue resistance can be made high when the intermediate bonding layer has a suitable hardness, and has a suitable thickness relative to the thickness of the aluminum base bearing alloy layer.

What is claimed is:

1. An aluminum base alloy bearing having a superior fatigue resistance, comprising a back metal layer, an intermediate bonding layer bonded onto the back metal layer, and an aluminum base bearing alloy layer bonded onto the intermediate bonding layer, the hardness of said intermediate bonding layer being in the range of 25 to 60 in terms of Vickers hardness, the thickness of said intermediate bonding layer being 0.5 to 0.9 times in the sum of both the thickness of said intermediate bonding layer and the thickness of said aluminum base bearing alloy layer.

2. An aluminum base alloy bearing according to claim 1, said intermediate bonding layer consisting, by weight, of at least one kind of 0.3 to 5% in total selected from the group consisting of Mn, Cu, Zn, Si, Mg and Fe, and the balance Al and incidental impurities.

3. An aluminum base alloy bearing according to claim 2, said aluminum base bearing alloy layer consisting, by weight, of 3 to 40% Sn, 0.1 to 3% Si, not more than 10% Pb, 0.2 to 5% Cu, at least one kind of not more than 3% in total selected from the group consisting of Ni, Mn, V, Mg and Sb, and the balance Al and incidental impurities.

4. An aluminum base alloy bearing according to claim 1, said aluminum base bearing alloy layer consisting, by weight, of 3 to 40% Sn, 0.1 to 3% Si, not more than 10% Pb, 0.2 to 5% Cu, at least one kind of not more than 3% in total selected from the group consisting of Ni, Mn V, Mg and Sb, and the balance Al and incidental impurities.

* * * * *